H. C. EHMKE.
VEHICLE.
APPLICATION FILED JAN. 30, 1914.

1,150,509.

Patented Aug. 17, 1915.
2 SHEETS—SHEET 1.

Witnesses:
Jacob Oberst Jr.
Eda M. Schweiter

Henry C. Ehmke, Inventor
By Emil Neuhart, Attorney

H. C. EHMKE.
VEHICLE.
APPLICATION FILED JAN. 30, 1914.

1,150,509.

Patented Aug. 17, 1915.
2 SHEETS—SHEET 2.

Witnesses:
Jacob Oberst, Jr.
Eda M. Schweiger

Henry C. Ehmke, Inventor,
By Emil Kinhart
Attorney.

UNITED STATES PATENT OFFICE.

HENRY C. EHMKE, OF FREDONIA, NEW YORK.

VEHICLE.

1,150,509.   Specification of Letters Patent.   Patented Aug. 17, 1915.

Application filed January 30, 1914. Serial No. 815,467.

*To all whom it may concern:*

Be it known that I, HENRY C. EHMKE, a citizen of the United States, residing at Fredonia, in the county of Chautauqua and State of New York, have invented certain new and useful Improvements in Vehicles, of which the following is a specification.

My invention relates to improvements in vehicles, and it has for its primary object the provision of means associated with the traction wheels whereby the weight of the vehicle body, and any load thereon, is utilized to assist in the forward or rearward propulsion of the vehicle, as the case may be.

It has for a further object to so construct the driving mechanism and arrange the same with reference to the traction wheels that the greater the resistance against the rotation of the wheels the greater will be the power exerted on the wheels to rotate the same.

While I have illustrated my invention in connection with a power propelled vehicle, it will be clear from the description to follow that the principle involved may be utilized on horse-driven vehicles, and in various other ways.

With the above and other objects in view, my invention consists in the novel features of construction and in the arrangement and combination of parts to be hereinafter described and more particularly pointed out in the subjoined claims.

Figure 1:
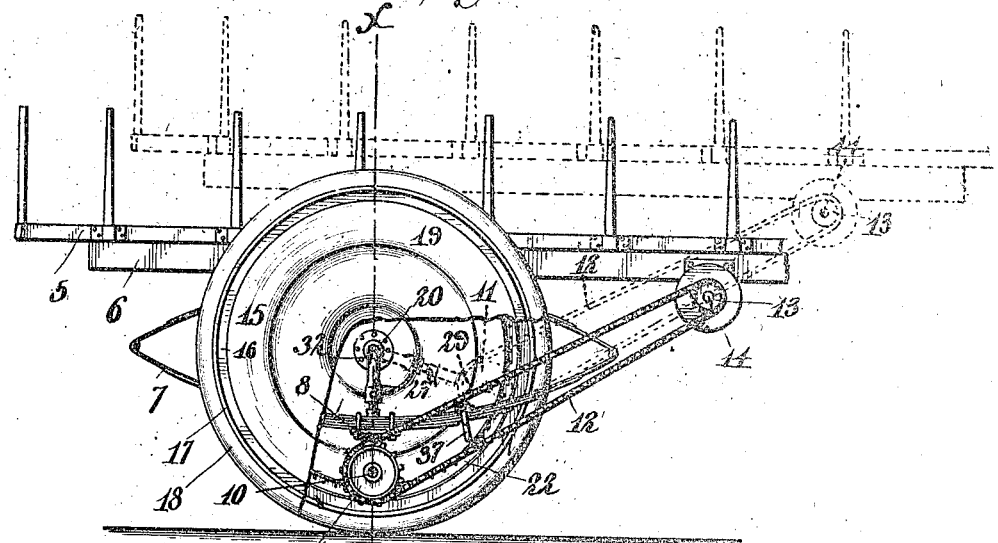
Figure 2:
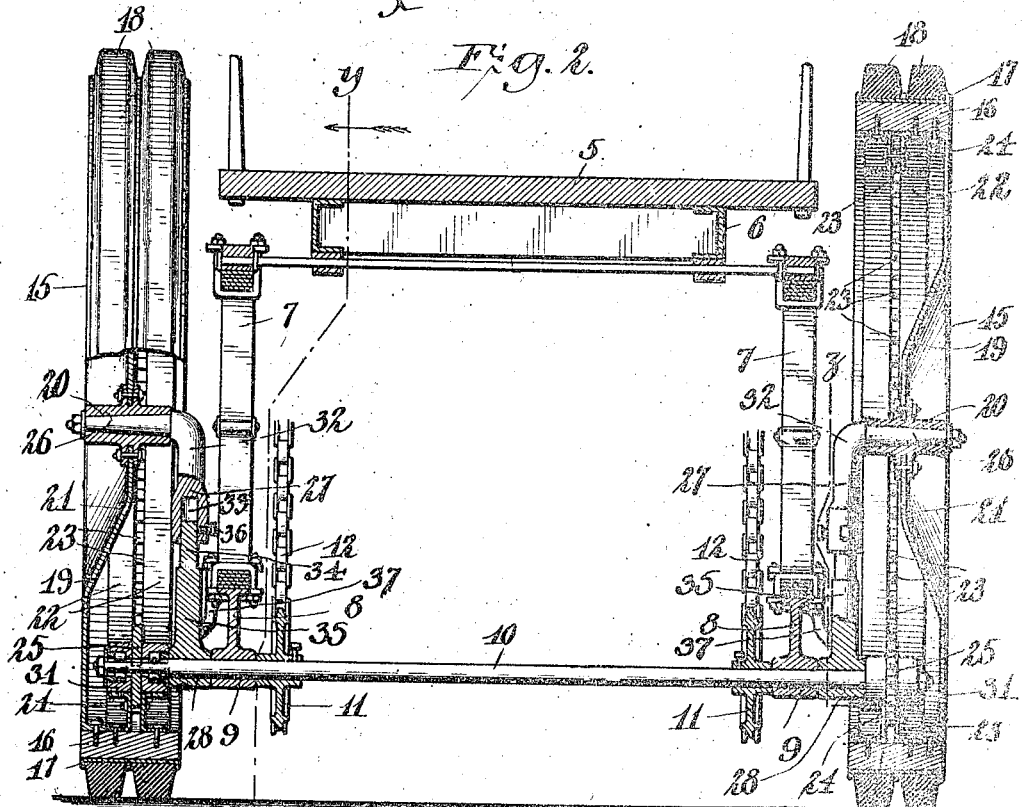
Figure 3:
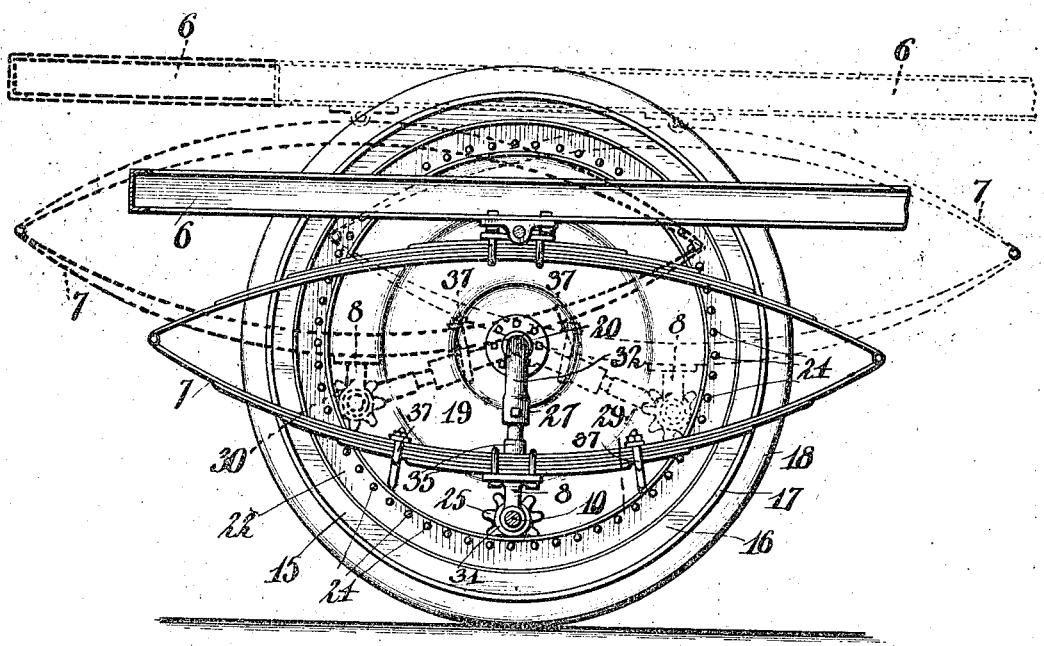
Figure 4:
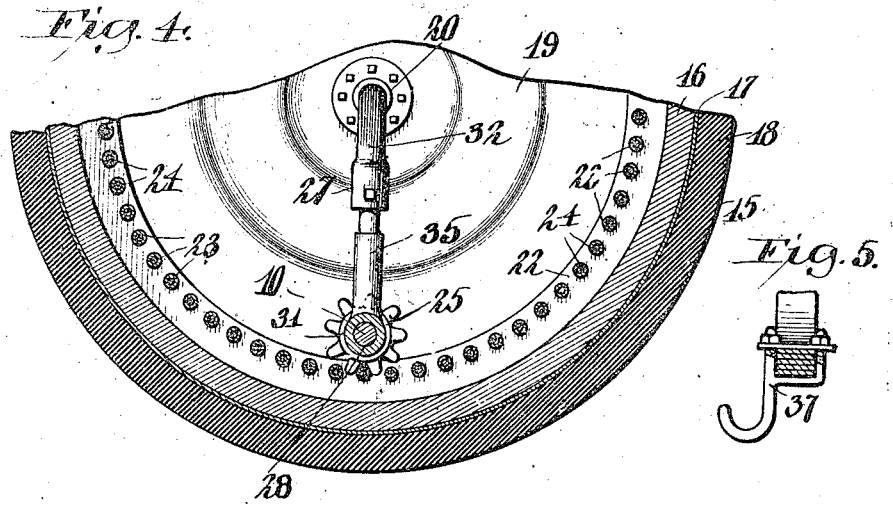
Figure 5:

In the drawings,—Figure 1 is a side elevation of the rear end of a power-propelled vehicle having a portion of the driving or traction wheel on the near side of the vehicle broken away to better illustrate parts behind the same. Fig. 2 is an enlarged transverse section taken on line $x$—$x$, Fig. 1, looking to the right. Fig. 3 is a vertical longitudinal section taken on line $y$—$y$, Fig. 2, the same being on a reduced scale. Fig. 4 is a vertical longitudinal section taken on line $z$—$z$, Fig. 2. Fig. 5 is a detailed view of one of the hooks adapted to be engaged by the depending members of the axles to prevent the swinging movement of the same beyond certain points.

In the embodiment of my invention illustrated in the accompanying drawing in which similar numerals of reference refer to similar parts throughout the several figures, 5 designates the vehicle body which is mounted on the chassis 6 constructed in any practicable manner, the chassis is supported upon the usual springs 7 which are secured to brackets 8 having bearings 9 therein in which is journaled a transversely-disposed driving shaft 10. On this driving shaft are secured driving elements 11, herein shown as in the form of sprocket wheels, around which are passed link chains 12 driven from any suitable source of power. In the particular embodiment disclosed, these chains extend forwardly and upwardly and pass around sprocket wheels 13 which are secured to a jack shaft 14 supported on the vehicle body, the jack shaft being driven by any suitable means from the source of power.

The parts thus far described are fixedly related, except in so far as the springs 7 permit independent vertical movement of the vehicle body with reference to the driving shaft 10, it being the intention that the vehicle body, the springs supporting the same and the driving shaft with all parts secured thereto shall move together in a forward or rearward direction, but it is to be understood that all forward or rearward movements of these parts are accompanied by a component upward or downward movement regardless of the flexibility of the vehicle springs 7.

15 designates the traction wheels, which in the embodiment herein disclosed serve as the driving wheels, and each of these wheels comprises a felly 16, a rim 17, a tire or tires 18, and a sheet metal or other body portion 19 having a hub 20. It is of course understood that the construction of wheel herein shown may be changed. In order that the driving means may be applied centrally to the wheel, the body portion 19 is dished, as at 21, so as to offset the marginal portion thereof from the central portion and at the same time have the connection of the hub to the sheet metal portion in a plane as near as possible centrally between the inner and outer faces of the wheel felly.

Secured to the inner peripheral surface of the felly are two spaced channel-shaped rings 22, which are held spaced by separator thimbles 23 through which are passed bolts 24 which retain the separator thimbles in place and at the same time prevent separation of said rings in the event of their securing means becoming unfastened. The separator thimbles are spaced equi-distantly around the wheel so as to provide what may be termed internal lantern gears and these gears are in mesh with driving pinions 25 secured to the end portions of the driving shaft 10. The inner peripheral faces of the channel-shape rings 22 serve as annular tracks on which ride rollers 31 rotatable on the end portions of said driving shaft, said rollers being arranged in pairs and those of each pair being located on opposite sides of a driving pinion. The driving mechanism is therefore steady in its operation, and possibility of the driving pinions working out of mesh with the internal lantern gears, which are preferably concentric within the wheel, is entirely obviated.

26 designates the axles on which the driving wheels are mounted for rotation, each wheel having a separate axle provided with a telescopic depending member 27 having a bearing 28 at its outer end in which the driving shaft 10 is mounted for rotation. Said bearings are situated between the brackets 8 and the driving pinions 25 and are capable of swinging in an arc of a circle with the axes of the driving wheels as their centers. The axles 26 and driving shaft 10 constitute a swinging mounting for the vehicle body, and by reason of forming the depending members 27 of the axles in two sections and telescoping them, the rollers 31 can be brought in contact with the inner peripheral faces of the channel-shaped rings 22 with the desired pressure and maintained in such relation. The preferred arrangement for telescoping the depending members 27 of the axles is best shown in Fig. 2 in which the inner section 32 of each has an axial socket 33 at its outer end to receive the inner end portion 34 of the outer section 35, and the parts are retained in adjusted position by set screws 36 which is passed through the socketed outer end of the inner section and bears against the inner end portion of the outer section.

The position of the driving pinions and the depending axle members, when the vehicle is at a standstill, is that shown in Figs. 1, 3 and 4, and when starting the vehicle the resistance of the wheels will permit the axles to swing forwardly into or toward the position shown by the dotted lines 29 in Figs. 1 and 3. This relative arrangement of parts is retained during the forward movement of the vehicle and when the parts are in this position, it is to be noted that the weight of the vehicle body and its load tends to force the driving shaft 10 downwardly and rearwardly, thus exerting its weight to rotate the driving wheels. It is apparent that the greater the distance the driving pinions 25 are located from the axes of the traction wheels the greater will be the power or lever action exerted against said wheels, and this is particularly desirable in automobile trucks where speed is not so important as power, it being of course understood that the larger the diameter of the internal gear on the traction wheels the slower will be the speed. On the other hand, for pleasure vehicles it may be desirable to reduce the diameter of the gears of the traction wheels, which will position the driving pinions 25 closer to the axes of said wheels and thus the speed will be increased although the power will be reduced, but such reduced power will still be greater than in the arrangements of driving mechanism now employed, but that feature of the invention in which the weight of the vehicle body is employed to assist in the forward or rearward propulsion of the vehicle will be retained regardless of the distance the driving pinions may be located from the axes of the traction wheels. In the event that these wheels enter a rut or strike an obstruction in the road, the power required to move the vehicle forward will necessarily have to be increased, and this additional strain will tend to elevate the driving shaft to a higher plane, where its power on the driving wheel will be increased in proportion. The weight of the body portion and its load will then tend to cause the wheels to climb out of the rut or rise over the obstruction, as the case may be, the action of the parts being similar to that of a treadmill in which the weight is applied forward of the center of the mill.

When reversing the vehicle the parts assume the position shown by the dotted lines 30 in Fig. 3, so as to bring the driving wheels in rear of the vertical center of the wheels and thus obtain a reverse action, in which the weight of the body and its load, if any, assist in the rearward rotation of the wheels. It is to be understood that the greater the resistance offered to the rotation of the wheels, the farther forward or rearward, as the case may be, will the driving pinions 25 be positioned, and it will be clear that the weight of the vehicle body and its load will have greater leverage in tending to rotate the vehicle when the driving pinions are at their maximum forward or rearward positions.

When the driving pinions 25 reach their maximum forward or rearward positions, the depending members 27 of the axles engage hooks 37 which are fastened to the springs 7, thus preventing the rising of said pinions to a point above the horizontal centers of the traction wheels. It is of course understood that the maximum forward or rearward positions of said driving pinions may be at the horizontal centers of the traction wheels, or at any point between the same and the vertical centers of said wheels, and since the maximum positions in which the driving pinions are believed to be most effective, are shown by dotted lines in Fig. 3, the hooks 37 engage the depending members of the axles when either of these positions are reached.

It is of course apparent that if my invention is applied to a vehicle other than a power driven vehicle, the shaft 10 will have no means to rotate it except the weight of the vehicle body, the action employed in such cases will be similar to like parts on the motor driven mechanism illustrated.

Having thus described my invention, what I claim is,—

1. In a vehicle, the combination of a pair of traction wheels having each an annular internal gear, a driving shaft, pinions on said shaft in mesh with said internal gears, means permitting the swinging of said driving shaft with its pinions through an arc of a circle having its center coincident with the axes of said annular gears, transmission mechanism imparting rotary movement to said driving shaft, brackets carried by said driving shaft, springs mounted on said brackets, and a vehicle body carried by said springs.

2. In a vehicle, the combination of a pair of traction wheels, each having a felly, a pair of spaced channel bars secured to the inner peripheral surface of said felly, separator thimbles secured between each pair of spaced channel bars at regular intervals around the wheels, driving pinions co-acting with said channel bars and separator thimbles, a driving shaft to which said pinions are secured, an axle for each traction wheel having a depending portion provided with a bearing at its outer end in which said driving shaft is journaled, a vehicle body supported on said driving shaft, and means for rotating said driving shaft.

3. In a vehicle, the combination of a pair of traction wheels having an annular gear provided with a pair of annular track surfaces, driving pinions co-acting with said annular gears, rollers at each side of each driving pinion rolling in contact with said annular tracks, a driving shaft to which said pinions are secured and on which said rollers are rotatably mounted, an axle for each traction wheel having a depending portion provided with a bearing at its outer end in which said driving shaft is journaled, a vehicle body supported on said driving shaft, and means for rotating said driving shaft.

4. In a vehicle, the combination of a pair of traction wheels having each an annular internal gear and an annular track, a driving pinion meshing with each annular gear, a roller in contact with each annular track, a driving shaft on which said driving gears and rollers are mounted, a vehicle body receiving support from said driving shaft, and means for rotating said driving shaft.

5. In a vehicle, the combination of a pair of traction wheels each having an annular gear and a pair of annular tracks, a driving pinion meshing with each of said annular gears, and a pair of rollers in contact with each pair of annular tracks, a driving shaft on which said driving gears are mounted, a vehicle body spring-supported on said driving shaft, and means for imparting power to said driving shaft.

6. In a vehicle, the combination of a pair of traction wheels having each a concentric gear, a pinion in mesh with each of said gears, a swinging mounting having its center coincident with the axes of said gears and being extensible a direction toward and from said axes, and a vehicle body supported by said swinging mounting.

7. In a vehicle, the combination of a pair of traction wheels having each an annular internal gear, a driving shaft, pinions on said shaft in mesh with said internal gear, an axle for each of said traction wheels having a telescopic depending portion provided with a bearing at its outer end in which said driving shaft is journaled, a vehicle body supported on said driving shaft, and means for rotating said shaft.

8. In a vehicle, the combination of a pair of traction wheels having each an annular gear and a pair of annular tracks, a driving pinion meshing with each of said annular gears, rolling members at each side of said driving pinions in contact with said annular tracks, a driving shaft on which said driving gears and rolling members are mounted, a vehicle body spring supported on said driving shaft, and means for imparting power to said driving shaft.

9. In a vehicle, the combination of a pair of traction wheels having each a concentric gear, a pinion in mesh with each of said gears, a swinging mounting having its center coincident with the axes of said gears, a vehicle body supported by said swinging mounting, and means to prevent the swinging of said mounting beyond certain points.

In testimony whereof I affix my signature in presence of two witnesses.

HENRY C. EHMKE.

Witnesses:
EMIL NEUHART,
JACOB OBERST, JR.